United States Patent [19]

Smith

[11] 3,815,684

[45] June 11, 1974

[54] MINIMUM TILLAGE TOOL

[76] Inventor: John H. Smith, R.R. 3, Box 96, Jonesville, La. 71343

[22] Filed: July 28, 1972

[21] Appl. No.: 276,120

[52] U.S. Cl. ................................ 172/694, 172/705
[51] Int. Cl. ............................................. A01b 15/00
[58] Field of Search .......... 172/265, 382, 508, 509, 172/512, 513, 516, 686, 694, 698, 701, 705, 719, 730, 766, 771

[56] References Cited
UNITED STATES PATENTS

| | | | |
|---|---|---|---|
| 3,252,522 | 4/1966 | Taylor | 172/701 X |
| 3,347,188 | 10/1967 | Richey | 172/510 X |
| 3,680,648 | 8/1972 | Tonsfeldt | 172/508 X |
| 3,708,019 | 1/1973 | Ryan | 172/705 X |

FOREIGN PATENTS OR APPLICATIONS

| | | | |
|---|---|---|---|
| 121,926 | 3/1900 | Germany | 172/512 |

*Primary Examiner*—Stephen C. Pellegrino
*Attorney, Agent, or Firm*—Pravel, Wilson & Matthews

[57] ABSTRACT

The specification discloses a minimum tillage tool for performing the final pre-planting tillage of prepared soil. Such tool includes a row capping blade for cleaning and shaping the top of a row and a pair of side forming blades for cleaning and shaping the lateral sides of the row. The side forming blades have lateral extending trail ends for urging soil and vegetation away from the sides of the row as it is formed. In one embodiment, a plurality of pivoted laterally extending blades are provided for pulverizing the soil forming the row to prepare it for planting.

10 Claims, 6 Drawing Figures

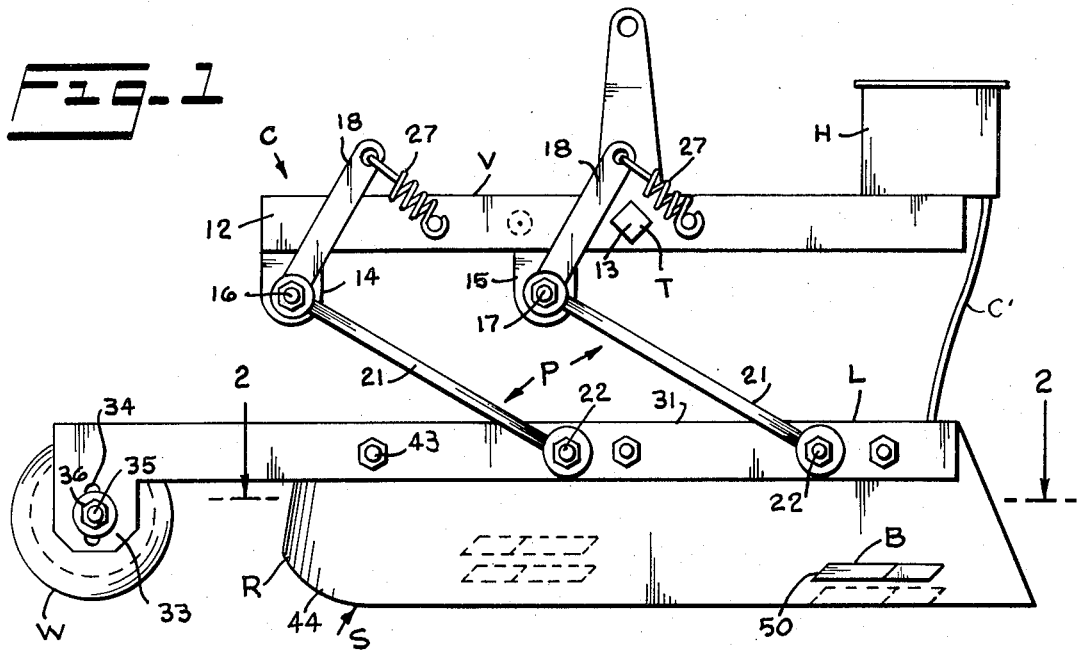
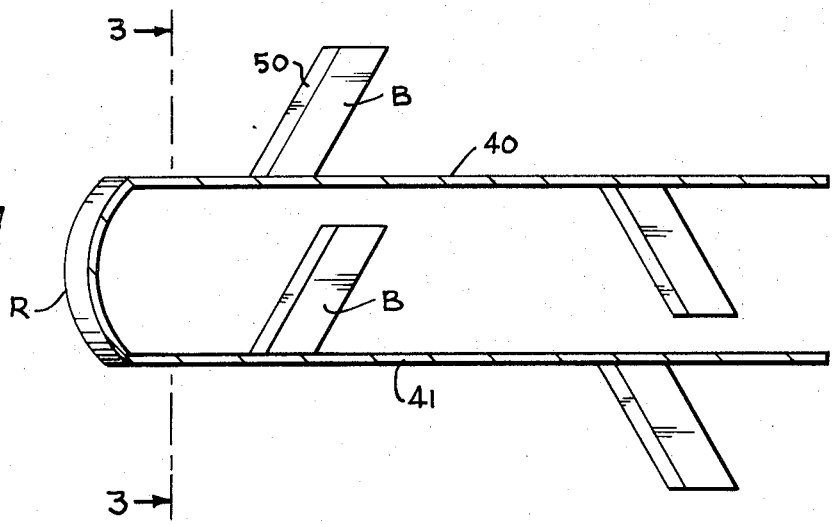
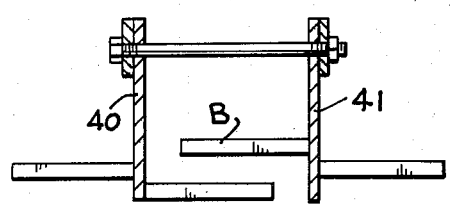

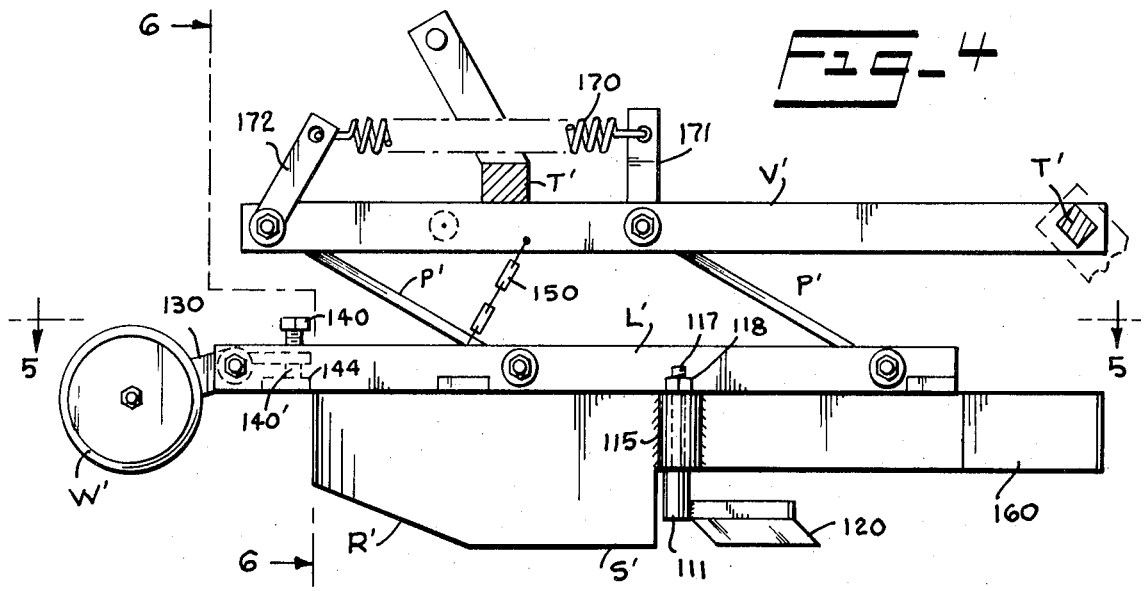
Fig-4
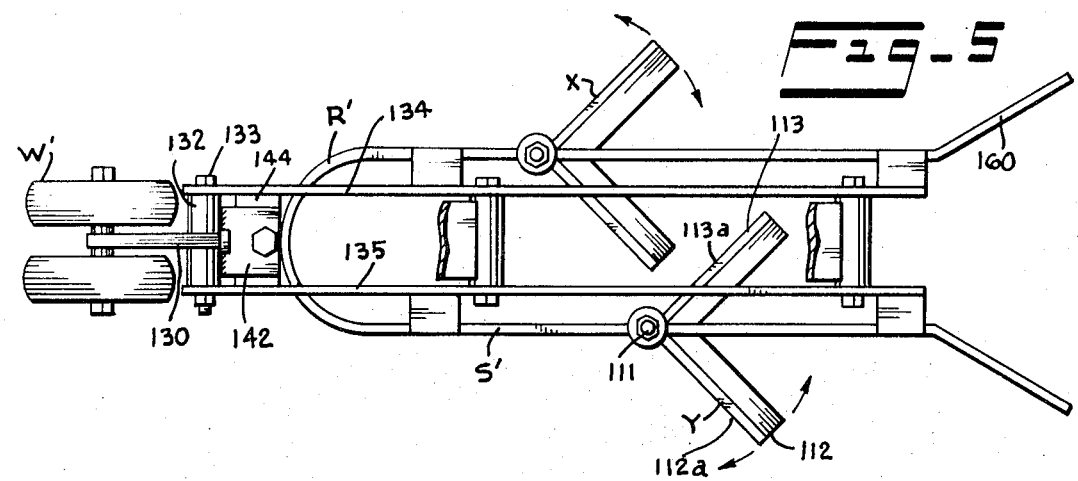
Fig-5
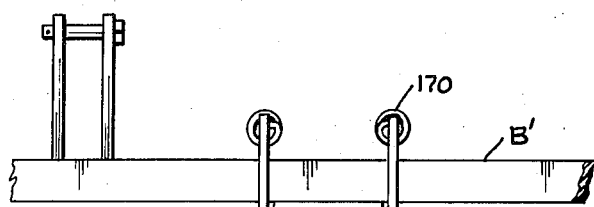
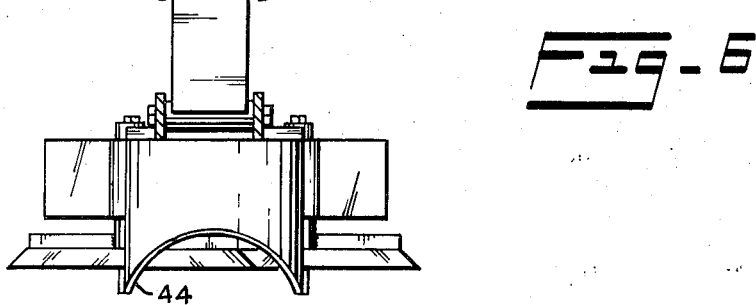
Fig-6

MINIMUM TILLAGE TOOL

BACKGROUND OF THE INVENTION

1. Field of the Invention

The invention pertains to a tillage tool for forming, shaping and preparing soil in rows for planting and for pulverizing soil adjacent the top of the row for receiving seeds, fertilizer, herbicides and the like. The tool is adapted to be pulled by the same tractor which pulls a planter to prepare the soil in a plowed field into rows suitable for planting by the planter and also to plant the rows in a single pass along the rows by the tractor.

2. Description of the Prior Art

In the prior art devices, after the soil is prepared for planting by forming rows or bedding, a planter is then drawn behind a tractor or a cultivator to distribute or insert the individual seeds into the soil at desired spaced intervals, however, preparing the soil and planting the seeds are normally separate operations which are performed in successive passes or trips over or along the same row. Thus, additional time and expense are required to complete the planting operation because the tractor or cultivator first traverses each row in the field to be planted to prepare the soil and must then repeat its trips over the field row by row a second time in order to plant the seeds in the prepared soil. Also, the delay between preparing the rows for planting and actually planting the seed in the rows allows the soil at or adjacent to the top or crown of each row to dry out and loose valuable moisture during the delay between preparation and planting.

SUMMARY OF THE INVENTION

The present invention provides a new and improved minimum tillage tool for use in preparing soil for planting row crops.

It is also an object of the present invention to provide a new and improved tool for preparing rows for receiving seeds including a row capping blade for cutting or cleaning dry dirt and vegetation off of the top of a row and a plurality of laterally extending blades for pulverizing the soil of the row to prepare such soil for receiving seeds during planting. Such device also includes side row cleaning blades for removing vegetation and dirt from adjacent sides of the rows and moving it into the area between adjacent rows.

Another object of the present invention is to provide a new and improved tillage tool for pulverizing the soil in the rows of soil preparatory to planting wherein such tool includes a plurality of laterally extending pivotally mounted blades or arms which pulverize the soil to prepare such rows for planting and which include rudder means to align the blades if they are pivoted to one side or another by an obstruction.

A further object of the present invention is to provide a new and improved minimum tillage tool adapted to be pivotally mounted on a tool bar of a tractor by a pair of substantially parallel pivoting arms to permit the tool to follow the contour of the ground over which the tractor travels and such tool includes a gauge wheel for setting or determining depth of the cut made by a plurality of laterally disposed pivotal cutters which break up or pulverize the upper portion of the soil in each row preparatory to placing the seeds therein.

BRIEF DESCRIPTION OF THE DRAWINGS

FIG. 1 is a side elevation of the minimum tillage tool of the present invention shown mounted on a tractor tool bar;

FIG. 2 is a top view taken on line 2—2 of FIG. 1 showing details of such tillage tool;

FIG. 3 is a sectional view taken on line 3—3 of FIG. 2;

FIG. 4 is a side elevation of an alternate embodiment of the minimum tillage tool having an adjustable elevation gauge wheel and having a plurality of pivotally mounted laterally extending blades for cutting or pulverizing the rows;

FIG. 5 is a sectional view taken on line 5—5 of FIG. 4 showing the pivotally mounted laterally extending blades which cut or pulverize the soil; and FIG. 6 is a sectional view taken on line 6—6 of FIG. 4 showing the elevation of the pivotally mounted laterally extending blades as positioned on the minimum tillage tool.

DESCRIPTION OF THE PREFERRED EMBODIMENT

The tillage tool of the present invention is designated generally C in FIG. 1 of the drawings. Such tool C comprises an upper support frame U which is mounted on a tool bar T that is carried on a tractor or cultivator (not shown) for attaching various tools thereto. Pivotally mounted on the upper support member L from which depends a U-shaped skirt S having a curved front portion R that forms or shapes the crest or cap of a row and laterally projecting side blades B mounted in the skirt S behind the row capping blade R are provided for pulverizing or breaking the soil adjacent to the top of the row to prepare such soil for receiving seeds that are planted therein.

With the minimum tillage tool of this invention which is provided for preparing land that has been formed into rows or bedded for planting, pre-planting tillage, injection of the herbicide into the rows of pulverized soil and planting of the seeds in such soil are accomplished in a single pass by the tractor and planting equipment over the land thereby substantially reducing required time as well as the distance traveled by a tractor or tractors in planting a field. The present invention also enables the seed to be planted in the soil immediately after preparation of such soil for planting has been completed and before valuable moisture is lost through vaporization.

Considering now the present invention in more detail, the upper support frame U includes a pair of substantially parallel steel straps or members 12 having a suitable opening 13 therein for receiving the tool bar T on which such upper frame U is mounted. A pair of longitudinally spaced lugs or ears 14 and 15, which project downwardly from the lower edge of the straps 12 are provided for receiving laterally extending pins 16 and 17 which pivotally connect the upper ends of the pair of L-shaped arms or members P to such upper frame U. Such arms P have upper members 18 which are pivotally connected to pins 16 and 17 in the lower frame L. An eye is formed at the upper end of the lower arms 21 which are pivotally connected to pins 22 in the arm 21 for receiving the pin 16 and a second eye is formed at its lower end for receiving the pin 22 for pivotally connecting the arm 21 to the upper support U and the lower support L. The upper arms 18 are connected by welding or other suitable means to the upper end of lower arms 21 and extend substantially at right angles to the arms 18 for receiving springs 27 which urge the straps 21 in a clockwise direction for urging the tillage tool downwardly into engagement with the earth being worked.

As best seen in FIGS. 1 and 2 of the drawings, the lower support member L includes a pair of laterally spaced substantially parallel members 31 formed of steel plate or other suitable material. The forward end of the parallel members 31 are provided with depending tabs 33 which have longitudinally extending slots 34 for receiving an axle 35 on which a front wheel W is mounted. Nuts 36 are provided on the threaded axle 35 for securing such axle at the desired elevation in the slots 34. Such wheel W is preferably provided with a concave surface which facilitates shaping of the crest or crown of the rows formed by the tillage tool of the present invention; also, such concave configuration facilitates guiding the tillage tool along the rows. The slot 34 permits the axle 35 on which the wheel is mounted to be moved upwardly or downwardly relative to the frame L to thereby adjust the position of the wheel W relative to the lower frame L and set the depth of the cut made by the blades B.

The skirt S comprises a U-shaped member having a pair of sides 40 and 41 positioned adjacent to the parallel members 31 and secured thereto by bolts 43 or other suitable securing means.

As shown in FIG. 1 of the drawings the forward curved portion R of the skirt S is inclined downwardly and forwardly from the support members 31. Also as shown in FIGS. 1 and 6, the lower edge 44 of the rounded or curved front portion R is curved downwardly and rearwardly to provide a blade for shaping the top of a row into an oval or rounded configuration.

The blades B are mounted on the sides 40 and 41 of the skirt S with the leading edges tapered at 50 to form shaped leading edges for engaging the soil. In the preferred form of this invention the blades B are formed of substantially flat plates of steel and are tapered or inclined from leading to trailing edge.

In the preferred form as illustrated in FIG. 3, the blades B are positioned on opposite sides of the U-shaped skirt S with the leading blades above the trailing blades and with the inner blades overlapping one another.

It will be appreciated that a plurality of the tool carriers C are normally mounted in laterally spaced relationship on a single tool bar T which is secured to a tractor by the usual means known to those skilled in the art.

In using the apparatus of the present invention a plurality of such carriers C are connected to the tool bar and laterally spaced relative to each other to correspond with the spacing desired for the rows in the particular field to be planted. After the rows have been prepared for planting the tractor or cultivator which carries the planter which performs the planting operation is driven along the rows with the tillage tool carriers C mounted thereon in front of whatever planting device is also carried by the tractor. With this arrangement, the leading curved edge 44 of the lower skirt forms or shapes the contour of the crown or top of the rows and also removes the vegetation therefrom as the tractor is driven along the rows. Simultaneously the side blades cut and pulverize the soil adjacent the top of the rows to prepare such soil for receiving the seed from the planter which is carried behind the tillage tool. Also, a suitable container H for dispensing a herbicide or fertilizer or both may be carried on the upper frame and discharged via conduit C' directly into the soil after it is pulverized if desired. The leading gauge wheel W may be adjusted so as to set the depth of the cut made by the blades B. The lower support frame L as well as the skirt S is supported on the pivoting arms P which allows the lower support frame L to move upwardly and downwardly to adjust to variations in the elevation of the field without tipping from front to rear so as to retain the tillage tool in a substantially horizontal position as it is moved across the field and along the rows.

Another embodiment of the apparatus of the present invention is illustrated in FIGS. 4, 5 and 6 wherein the upper support frame U' is shown mounted on the tool bar T' for attachment to a tractor (not shown). Pivotally mounted on the upper support frame U' by substantially parallel pivot arms P' is a lower support member L' which carries the U-shaped skirt S' with its curved front portion R'. As shown in FIGS. 4 and 5 of the drawings, the rear portion of the skirt S' is cut away for receiving the pivotally mounted laterally extending blades X and Y, respectively. Such blades are carried on the opposite sides of the U-shaped skirt S' and are positioned one ahead of the other so that the inner arms of each such blade overlap in the inner portion of the U-shaped skirt S'.

Considering now this embodiment of the present invention in more detail, the pivoted blades X and Y are substantially identical except for their location with respect to the U-shaped skirt S' and for convenience, the blade Y will be described in detail. As shown, the blade Y has a generally V-shaped configuration with a pivot pin or pivot shaft 111 mounted in the skirt S' as will be described in detail hereinafter and with a pair of laterally and rearwardly extending arms or cutting members 112 and 113 extending rearwardly from such shaft or pivot member 111. The shaft 111 is pivotally mounted in a suitable sleeve 115 which is positioned in the skirt S' and the shaft 111 is preferably provided with a threaded upper end 117 which receives a nut or other locking 118 for securing the pivotal shaft 111 in the sleeve 115. Suitable bearings (not shown) may be provided for facilitating the rotation of the pivoted shaft 111 in the sleeve 115, if desired. The blades or arms 112 and 113 are preferably welded or otherwise suitably secured to the lower end of the pivot shaft 111 and are provided with forward facing sharpened cutting edges 112a and 113a, respectively. As best seen in FIG. 4 of the drawings, a steering rudder 120 is provided on the blade Y for guiding the blades as they cut the soil. The blade 120 extends rearwardly from the pivot pin 111 and projects downwardly beneath the cutting edges of the laterally extending blades 112 and 113.

With the pivoted cutting blades, in the event one of the laterally extending edges 112 or 113 should encounter a rock, root or other obstruction in the field, the blade will simply pivot laterally to one side thus preventing the blade arms 112 and 113 from being broken or otherwise damaged by the obstruction. After the obstruction has been passed, the rudder member 120 will act to return the blade to its centered position as shown in FIG. 5 of the drawings. Thus, it will be appreciated that with the pair of cutting blades X and Y positioned one ahead of the other with their inner arms overlapping or extending inwardly one in front of the other in the U-shaped skirt S, the center or crown portion of a row will be cut or pulverized from either side and, in the event one or the other of the blades is pivoted laterally from its centered position, the other blade will nevertheless continue cutting until and unless it encounters an obstruction so that it is pivoted away from its centered position.

With respect to the gauge wheel W' in the embodiment shown in FIGS. 4 and 5 of the drawings, an adjusting arm 130 is shown pivotally mounted on the sleeve 132 which is supported by the bolt 133 between the laterally spaced bars or support members 134 and 135. An adjusting screw 140 is provided in the plate 142 secured at the aft end of the bar 130 and, as shown in FIG. 4 of the drawings, the lower end 140' of the adjusting screw 140 engages a plate 144 which is welded or otherwise secured between the straps or bars 134 and 135 to enable an adjustment to be made in the depth of the cut of the blades X and Y by adjusting the screw 140 to set the elevation of the gauge wheel W'. Thus by adjusting the gauge wheel W', the working depth of the blades X and Y may be set as desired. Also, a stop chain 150 is provided for connecting or linking the upper support frame U' to the lower support frame L' to support the lower frame when the unit is being transported.

Also, as shown in FIG. 5 of the drawings, the trailing end 160 of the side skirts S' is turned laterally outwardly relative to the straight sides S' and also, as best seen in FIG. 4 of the drawings, the rear or trailing portion 160 is cut away or relieved adjacent its lower side so as to provide a space for the swinging or pivoting blade Y. Further, hold down springs 170 are connected at one end to an upwardly extending member 171 which is fixed to the upper frame U' and the opposite end of spring 170 is connected to a pivoted length 172 which is connected to the pivot arm P' so that with tension on the spring 170 the pivot arm P' urges the lower support frame L' downwardly so as to hold it in engagement with the earth's surface in case the gauge wheels strike an object which tends to lift or cause the lower support frame L' to rise relative to the ground.

The foregoing disclosure and description of the invention are illustrative and explanatory thereof, and various changes in the size, shape and materials as well as in the details of the illustrated construction may be made without departing from the spirit of the invention.

I claim:

1. A minimum tillage tool for preparing soil for planting comprising:
    a. an upper support frame adapted to be carried on a tractor;
    b. a lower support frame;
    c. means for movably connecting said lower support frame to said upper support frame to permit said lower frame to move upwardly and downwardly without tilting;
    d. a row top forming means carried by said lower support frame and having a lower concave curved portion for shaping the top of a row;
    e. row side forming means positioned adjacent said row top forming means for forming the sides of a row and;
    f. pulverizing means carried by said row side forming means for pulverizing the soil adjacent the top of the row to prepare such soil for receiving seeds.

2. The invention of claim 1 wherein said means for movably connecting said lower support frame to upper support frame include a pair of substantially parallel arms pivotally connected to said lower support frame and said upper support frame.

3. The invention of claim 2 including spring means connected to said parallel arms and said upper support frame for urging said lower support frame downwardly relative to said upper support frame.

4. The invention of claim 1 including adjusting means with said means for movably connecting said lower support frame to said upper support frame for adjusting the depth of penetration by said pulverizing means into the top of a row.

5. The invention of claim 4 wherein said depth adjusting means includes a gauge wheel rotatably mounted on said lower frame in front of said row top forming means.

6. The invention of claim 1 wherein the said means for pulverizing soil adjacent the top of the row to prepare such soil for receiving seeds includes a plurality of laterally extending blades carried by said lower support frame.

7. The invention of claim 1 wherein said means for pulverizing the soil adjacent the top of the row includes blade means pivotally connected to said row side forming means and projecting laterally therefrom.

8. The invention of claim 7 wherein said pivotally mounted blade means includes a V-shaped blade having arms extending laterally and rearwardly from said pivot connection.

9. The invention of claim 7 including rudder means connected to said pivotally mounted blade means for returning said blade means to a central position after being pivoted out of such central position.

10. The invention of claim 9 wherein said rudder means is connected to said pivotally mounted V-shaped blade means adjacent the pivot point and extends downwardly and rearwardly thereof.

* * * * *